Figure 1:
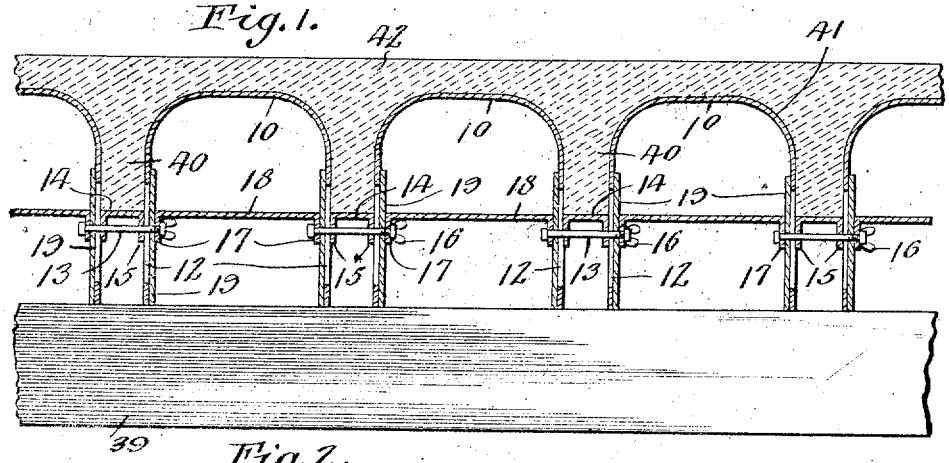

C. A. HAMMETT.

FALSE WORK FOR CONCRETE CONSTRUCTIONS.

APPLICATION FILED MAY 11, 1914.

Reissued Mar. 27, 1917.

14,278.

2 SHEETS—SHEET 1.

Witnesses

E. Andresen Jr.

D. W. Gould.

Inventor

Charles A. Hammett,

By Frank O. Parker

Attorney

C. A. HAMMETT.

FALSE WORK FOR CONCRETE CONSTRUCTIONS.

APPLICATION FILED MAY 11, 1914.

Reissued Mar. 27, 1917.

14,278.

2 SHEETS—SHEET 2.

Witnesses

E. Schuessler Jr.

D. W. Gould.

Inventor

Charles A. Hammett,

By Frank O. Parker

Attorney

UNITED STATES PATENT OFFICE.

CHARLES A. HAMMETT, OF WASHINGTON, DISTRICT OF COLUMBIA.

FALSE WORK FOR CONCRETE CONSTRUCTIONS.

14,278. Specification of Reissued Letters Patent. Reissued Mar. 27, 1917.

Original No. 1,079,045, dated November 18, 1913, Serial No. 679,537, filed February 23, 1912. Application for reissue filed May 11, 1914. Serial No. 837,954.

*To all whom it may concern:*

Be it known that I, CHARLES A. HAMMETT, a citizen of the United States of America, residing at Washington, District of Columbia, have invented certain new and useful Improvements in False Work for Concrete Constructions, of which the following is a specification.

The invention relates to a false work for building construction and more particularly to the class of adjustable knock-down or collapsible forms for composite constructions.

The primary object of the invention is the provision of a form or mold of this character in which a cementitious, plastic or composite foundation, for instance, flooring, may be constructed with a series of ribs of various width and depth spaced on centers, to develop the maximum compression area above the neutral axis.

Another object of the invention is the provision of a form or mold in which a single or plurality of removable fillers may be placed so as to regulate or determine the depth of the ribs in a floor construction.

A further object of the invention is the provision of a mold or form in which a plurality thereof can be properly and accurately centered with uniformity and the fillers therein adjusted in various places or planes to increase or decrease the depth of the ribs in the floor construction.

A still further object of the invention is the provision of a mold or form in which the sections thereof can be readily adjusted according to the area of the floor to be constructed, and on the setting and drying of the material thereof the said forms or sections may be conveniently and quickly removed, collapsed or disassembled.

A still further object of the invention is the provision of a filler of novel construction, and which is secured in position, in connection with certain reinforcements, between the sides of the sections, in such a manner as to admit of the ready and convenient setting up of the parts, the adjustment of the filler where adjustment is necessary, and the ready, quick and convenient disassemblage and removal of the parts in taking down the form, the construction also being such that the forms or mold sections may be disconnected and withdrawn in a straight vertical direction, and without lateral movement.

A still further object of the invention is the provision of a mold or form of this character which is simple in construction, conveniently set up, reliable and efficient in its purposes and inexpensive in manufacture.

Other objects of the invention will be in part obvious and in part pointed out hereinafter.

The invention accordingly consists in the features of construction, combination and elements and arrangement of parts which will be exemplified in the construction hereinafter set forth and the scope of the application of which will be indicated in the following claims.

Figure 2:
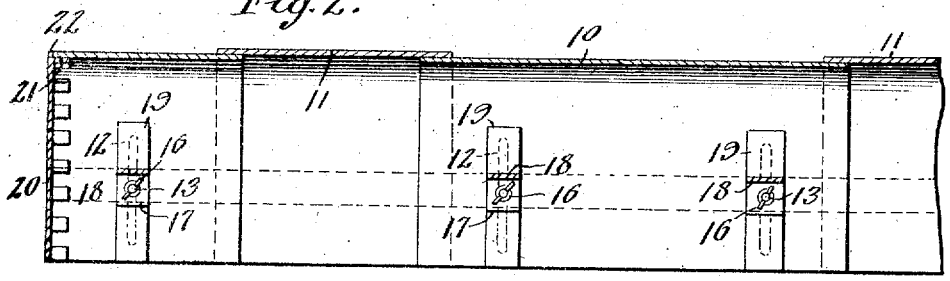
Figure 3:
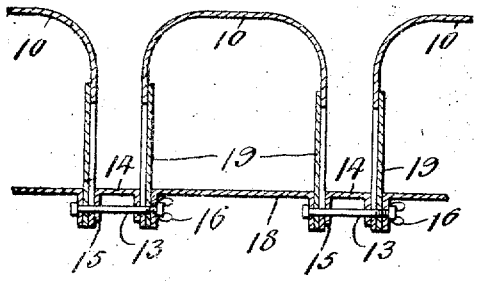
Figure 4:
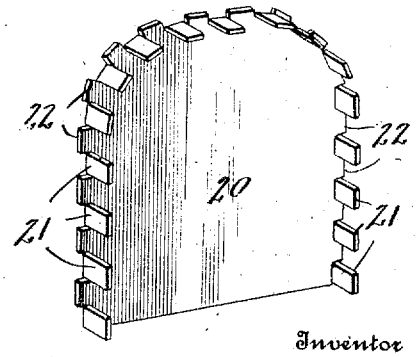
Figure 5:
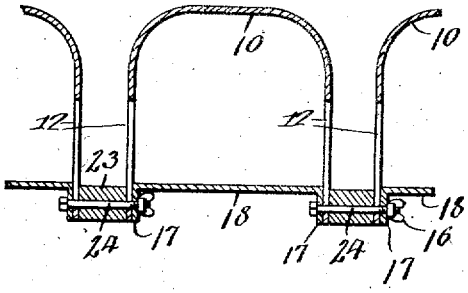
Figure 7:
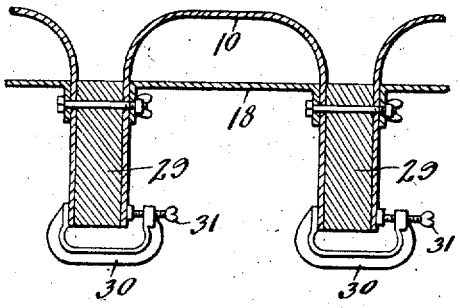
Figure 6:
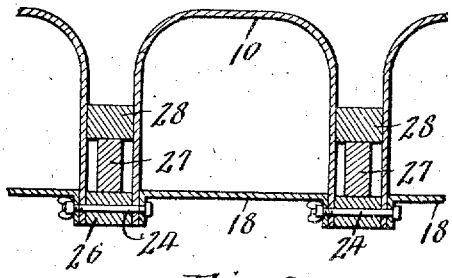
Figure 8:
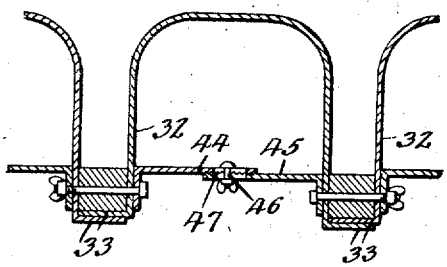
Figure 9:
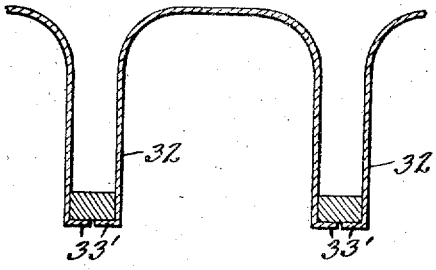
Figure 10:
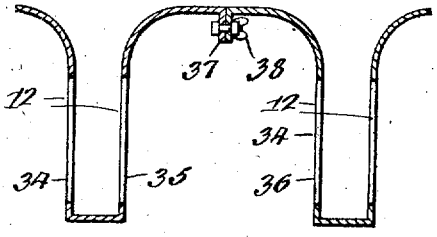
Figure 11:
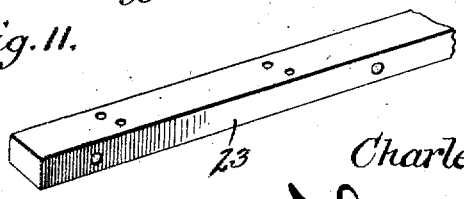

In the drawings:—Figure 1 is a fragmentary vertical transverse sectional view through the false work constructed in accordance with the invention. Fig. 2 is a vertical longitudinal sectional view of the same. Fig. 3 is a fragmentary vertical transverse sectional view similar to Fig. 1, but showing the fillers in different position. Fig. 4 is a perspective view of the end cap removed. Fig. 5 is a similar view of a modification. Fig. 6 is a similar view of a further modification. Fig. 7 is a similar view of a still further modification. Fig. 8 is a similar view of a still further modification. Fig. 9 is a similar view of a still further modification. Fig. 10 is a view of a still further modification. Fig. 11 is a fragmentary perspective view of one of the fillers removed.

Similar reference characters indicate corresponding parts throughout the several views in the drawings.

Referring to the drawings by numerals, the false work or molds for the concrete construction comprises a plurality of upwardly arched or bowed alternately arranged form or mold sections 10 and 11 respectively; preferably constructed from sheet metal, having either flat or vertical corrugated surfaces, the sections 11 being designed to telescope over the ends adjacent thereto of the sections 10 and serve as intermediate sections, so as to afford continuous unbroken forms or molds when said sections have been assembled for the construction of a concrete flooring in a manner presently described. The sections 10 in the sides thereof are provided with vertical slots 12, the slots being formed near opposite ends of the said sections, although they may be located at any other point therein, and through which are passed transversely arranged bolt members 13 adapted for vertical adjustment in the said slots, to support adjustable fillers comprising inverted U-shaped or channeled bars 14, preferably constructed from sheet metal and having depending side flanges 15 on which are formed alining holes receiving the bolt members 13, which have threaded thereon binding or locking nuts 16 for the fastening of the said bars 14 in adjacent position between the sides of the sections 10 and 11 adjacent to each other. It is of course understood that the bars 14 may be of any required length as the occasion may require. Connected with the bolt members 13 are the down-turned ends 17 of bracing bars, strips or spacing rods 18 which prevent the crushing in or the separation of the said sections, and also sustain the same uniformly spaced with respect to each other when the sections are properly positioned for use.

Carried by the bolt members 13 are closure strips 19 which are designed to bridge the slots 12 to prevent the cementitious material from leaking through the same when the sections are in assembled relation for the formation of a floor. These closure members or strips are also adapted to assist in more rigidly uniting the parts and to rest upon beams of the supporting under-structure or framework, and thereby serve as supplemental supports to further brace the sides of the mold sections against the weight or pressure of the plastic material.

Adapted for closing the free open ends of the outermost sections 10 or 11 of a series when assembled are end closure heads or caps 20 made from sheet metal, the same being of a shape corresponding to the cross sectional contour of the said sections and formed at the top and side edges with inturned right angular tongues 21 between which are provided abutment nibs 22 which respectively engage the inner surfaces and outer edges of said section for the mounting of the heads or caps 20 in closing position as shown in the drawings.

The sections 10 and 11 when assembled and in operative position for the formation of the concrete floor are arranged in parallel rows and are connected and assembled in the manner as heretofore set forth.

In Fig. 5 of the drawings is shown a modification of filler which comprises a strip 23 preferably constructed from wood having a suitable transverse opening receiving the bolt 24 which is mounted in the sections 10 in an identical manner as the bolt member 13 so that this strip 23 may be substituted for the filler heretofore described.

In Fig. 6 is shown a further modification of filler which comprises in addition to the strip 26 identical to the strip 23 but serving as a supporting base, a vertically disposed board 27 upon which is superimposed a soffit strip 28, thus, in this manner, the height or depth of the filler can be increased or decreased, it being understood of course that it will be only necessary to vary the depth of the board 27 as will be obvious.

In Fig. 7 of the drawings is shown a still further modification of filler which comprises a solid wood beam 29 which may be of any required depth and is fastened in place between the sides adjacent to each other of the sections 10 by means of a yoke-like clamp 30 having a binding screw 31 which also fastens the bracing or spacing rods heretofore referred to.

In Figs. 6 and 7 of the drawings the bolt members are non-adjustably mounted in the sections.

In Fig. 8 is shown a modification of mold or form which comprises the upwardly arched or bowed sections 32 having at their longitudinal edges inturned flanges 33 adapted to overlap each other, as shown at 33 in said figure, or to abut against each other, as shown at 33′ in Fig. 9 of the drawing, to support the filler.

In Fig. 10 of the drawings is shown a further modification of mold or form which comprises an upwardly arched or bowed section 34 formed of two parts 35 and 36, the edges thereof at the crown of the section being down turned to provide flanges 37 which are connected by means of detachable fasteners, a single one only being shown and indicated at 38.

In constructing a concrete floor the false work is employed in the following manner: The sections 10 and 11 are telescoped so as to form unbroken continuous rows arranged in the same plane with each other and the fillers are inserted between the sides of the sections and fastened in adjusted position by means of bolt members or clamps to which are connected spacing rods as heretofore set forth, the sections being supported upon temporary joists 39 which are supported in any suitable manner as usual; and poured into the spaces between the sides of the sections 10 and 11 is concrete which fills the said spaces and also covers the crowns of said sections to provide the ribs 40, arched hollows 41 therebetween and the floor slab 42, the said ribs being of any required depth. It is of course understood that the depth of the ribs 40 may be increased or decreased according to the adjustment of the fillers between the sides of the section. By reason of the upwardly bowed or arched formation of the said sections 10 and 11 it enables an increased area of concrete to be formed at the neutral axis of each rib in the floor construction for effecting a maximum of strength, rigidity, and efficiency in the floor. Thus, it will be seen that hollow tiles may be entirely dispensed with and thereby dispensing with a resulting dead load and at the same time effecting a considerable saving in the consumption of concrete material or other cementitious substance when constructing the floor in a manner as heretofore stated. The sections 10 and 11 and their adjunct parts when assembled remain in such position until the concrete or like material has become set and hardened, whereupon the same are collapsed or knocked down for further use, as will be clearly understood.

It will be observed that the sides of the arched mold sections 10 are straight and parallel and that the sides of adjacent sections are adjustable to a certain degree with relation to each other to vary the width of the rib-forming space between them, as occasion may require. It will also be seen that in the form of the invention shown in Figs. 1 to 3, inclusive, the fillers 14 are of channeled construction, with their flanges projecting downwardly and forming broad vertical friction surfaces, giving a proper degree of bearing contact with the sides of adjacent sections 10 and also adequate connecting portions for the passage therethrough of the bolts 13. By disposing the sides of adjacent sections 10 in parallel relation and providing the channeled fillers with down-turned flanges, provision is made for closely sealing the joints between the contacting surfaces to prevent or reduce to the minimum leakage of the material downward between the sides of the molds. Furthermore, the channeled form of the fillers, which renders them of great strength, enables the parts, when connected and braced as described, to be made of comparatively thin sheet metal without sacrifice of strength and with great advantage in point of reduction of cost of the mold parts, and greater convenience and reduction of expense in handling and shipping the same from point to point, over molds and cooperating parts commonly made of wood. The channeled form of the filler also adapts it for engagement with under-lying vertical posts or supports, against any tendency to shift.

It will be further observed that, by the use of single bolts commonly uniting the sides of adjacent sections, the fillers and the spacing members or braces 18, as well as the cover plates 19, when employed, the amount of time and labor required in setting up or taking down the mold is materially reduced over molds having a plurality of fastening elements for holding similar parts in position, and by also constructing and arranging the elements as described, an advantage is obtained which is present in all the forms of my invention, and that is that upon disconnecting the fastenings, the mold sections, braces and the cover plates (if used) may be taken down in a straight vertical direction and without lateral motion. Also, it will be observed that in all the forms of my invention the spacing members or braces 18 extend between the sides of an arch section, preferably on a direct horizontal line with the fillers, so that the parts are supported and the strains distributed and sustained in such a way as to give the greatest amount of supporting strength and rigidity to the walls of the forming sections.

Another important advantage resulting from my improved construction of forming members is that by making the forming members of sheet metal, each in a single piece, as shown, economy of manufacture is secured as well as lightness of weight and capability of nesting the parts together, thus reducing the amount of labor in handling the molds and transportation cost in shipping the same from place to place for use. The use of sheet metal also allows the sides of the mold sections to be sprung either outward or inward for fitting purposes or to more readily release the molds in taking them down. It will be evident that the horizontal transverse braces between the sides of the mold sections hold such sides of the sections from collapse and thus permit of the efficient and reliable use of sheet metal molds. By taking down the mold sections after the floor slabs have set, the removed mold sections may be employed in forming another mold, thus reducing the number of mold sections required to be made and carried by the builder or contractor.

In Fig. 8 of the drawings there is shown a spacer bar comprising two parts 44 and 45, respectively, which are connected at their overlapping ends by means of a bolt member 46, the adjacent faces of the overlapped ends being provided with interlocking teeth 47, to prevent slipping of the parts of the spacer when connected together.

From the foregoing description, taken in connection with the accompanying drawings, it is thought that the construction and operation of the invention will be clearly understood, and therefore, a more extended explanation has been omitted.

What is claimed is:—

1. A false work for concrete construction comprising rows of arched sections, the sides of each section being provided with slots, fillers between adjacent sides of adjacent sections, spacer bars between the sides of each section, cover plates extending over said slots and single bolts extending through the opposed slots in each of said sections, said spacer bars, and through said fillers and adjustable cover plates.

2. A false work for concrete construction comprising rows of arched sections, the sides of each section being parallel, fillers arranged between the sides of adjacent sections, spacer bars between the respective sides of each section, and single bolts passing transversely through the fillers, adjacent sides of adjusted sections and adjacent ends of respective spacer bars.

3. A false work for concrete construction comprising rows of arched sections, the sides of each section being provided with slots, fillers between adjacent sides of adjacent sections, spacer bars between the sides of each section, cover plates extending over said slots, and fastening means coöperating with the opposed slots in each of said sections, said spacer bars and through said fillers, and adjustable cover plates.

4. A false work for concrete construction comprising rows of arched sections, the sides of each section being parallel, adjustable channeled fillers arranged between the sides of adjacent sections and having their flanges down-turned and lying in abutting and sliding engagement with said sides, and bolts connected with the said down-turned flanges of the fillers and adjustably engaging the sides of adjacent sections and thus detachably and adjustably securing said fillers in position.

5. A false work for concrete construction comprising rows of arched sections, the sides of each section being parallel, adjustable channeled fillers arranged between the sides of adjacent sections and having their flanges down-turned and lying in abutting and sliding engagement with said sides, and single bolts passing through the said down-turned flanges of the fillers and adjustably engaging the sides of adjacent sections and thus detachably and adjustably securing said fillers in position.

6. A false work for concrete construction comprising rows of arched sections, the sides of each section being parallel and provided with vertical slots, adjustable channeled fillers arranged between the slotted sides of adjacent sections and having their flanges down-turned and lying in abutting and sliding engagement with said sides, and bolts engaging the slots in the sides of the sections and the down-turned flanges of the fillers and slidably, detachably and adjustably supporting said fillers in position.

7. A false work for concrete construction comprising rows of arched sections, the sides of each section being parallel and provided with vertical slots, adjustable channeled fillers arranged between the slotted sides of adjacent sections and having their flanges down-turned and lying in abutting and sliding engagement with said sides, and a bolt passing transversely through the down-turned flanges of each filler and the slots in the sections and slidably, adjustably and detachably securing said filler in position.

8. A false work for concrete construction comprising parallel arched sections, horizontal transverse fillers arranged between the sides of adjacent sections, said fillers being adjustable in the spaces between said sides for forming ribs of varying depth, horizontal transverse spacer bars between the sides of each section and adjustable with said fillers, and a fastening means passing through and connecting the fillers, adjacent sides of the sections and adjacent ends of respective spacer bars in relative position and adjustable upon the sides of the sections.

9. A false work for concrete construction comprising parallel arched sections, the adjacent sides of adjacent sections being provided with vertical slots, horizontal transverse fillers adjustably mounted between the slotted sides of adjacent sections, horizontal transverse spacer bars between the sides of each section and a fastening means passing through the fillers, spacer bars and the slots in the adjacent sides of the sections and coupling and adjustably mounting said fillers and spacer bars in relative position.

10. A false work for concrete construction comprising parallel arched sections, the sides of each section being provided with vertical slots, horizontal transverse channeled fillers adjustably mounted between the slotted sides of adjacent sections and having their flanges down-turned and frictionally engaging the sides of the sections, horizontal transverse spacer bars between the sides of each section, and a fastening means passing through and connecting the flanges of the fillers and the adjacent ends of the respective spacer bars and extending through the slots in the sides of the sections and adjustably supporting the fillers and spacer bars thereon.

11. A false work for concrete construction comprising parallel arched sections, fillers adjustably mounted between the adjacent sides of adjacent sections, braces adjustably mounted between the sides of each section, vertical plates upon the outer faces of the sides of each section in line with the fillers and horizontal braces, and fastening means passing through and conjointly uniting said parts.

12. A false work for concrete construction comprising forming members having straight sides arranged in parallel relation and adjustable with relation to each other, horizontal fillers adjustably mounted between the sides of adjacent sections and in frictional engagement therewith, and means for adjustably uniting the sides of the sections and the adjustable fillers in position, said uniting means passing through said sides of the sections and the fillers.

In testimony whereof, I affix my signature in the presence of two witnesses.

CHARLES A. HAMMETT.

Witnesses:
RICHARD P. O'NEILL,
MARY M. LYDDANE.